United States Patent
Dai et al.

(10) Patent No.: US 11,392,235 B2
(45) Date of Patent: Jul. 19, 2022

(54) DISPLAY SUBSTRATE, METHOD FOR MANUFACTURING THE SAME, AND DISPLAY DEVICE

(71) Applicants: MIANYANG BOE OPTOELECTRONICS TECHNOLOGY CO., LTD., Sichuan (CN); BOE TECHNOLOGY GROUP CO., LTD., Beijing (CN)

(72) Inventors: Ming Dai, Beijing (CN); Dandan Jiang, Beijing (CN); Qicheng Chen, Beijing (CN); Xuwei Li, Beijing (CN); Haoyuan Fan, Beijing (CN); Jenyu Lee, Beijing (CN)

(73) Assignees: MIANYANG BOE OPTOELECTRONICS TECHNOLOGY CO., LTD., Sichuan (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 17/333,310

(22) Filed: May 28, 2021

(65) Prior Publication Data

US 2022/0129096 A1    Apr. 28, 2022

(30) Foreign Application Priority Data

Oct. 22, 2020   (CN) .......................... 202011138437.3

(51) Int. Cl.
  *G06F 3/041*   (2006.01)
  *G06F 3/047*   (2006.01)
  *G06F 3/044*   (2006.01)

(52) U.S. Cl.
  CPC .......... *G06F 3/0412* (2013.01); *G06F 3/0445* (2019.05); *G06F 2203/04103* (2013.01); *G06F 2203/04111* (2013.01)

(58) Field of Classification Search
  CPC ................. G06F 3/0412; G06F 3/0445; G06F 2203/04103; G06F 2203/04111
  See application file for complete search history.

(56) References Cited

U.S. PATENT DOCUMENTS

| | | | | |
|---|---|---|---|---|
| 2016/0283000 A1* | 9/2016 | Wang | ..................... | G06F 3/0443 |
| 2017/0277326 A1* | 9/2017 | Cao | ....................... | G06F 3/0446 |
| 2021/0041969 A1* | 2/2021 | Zhao | ...................... | G06F 3/041 |

* cited by examiner

*Primary Examiner* — MD Saiful A Siddiqui
(74) *Attorney, Agent, or Firm* — Brooks Kushman P.C.

(57) ABSTRACT

A display substrate includes: a base substrate; a first driving signal line arranged at a camera-free region; a second driving signal line arranged at an under-screen camera region, a light transmittance of the first driving signal line being smaller than a light transmittance of the second driving signal line, and the second driving signal line including at least two layers of leads; and a touch structure arranged on the base substrate and arranged at at least one of the camera-free region and the under-screen camera region. The touch structure includes at least two layers of touch signal lines, one layer of touch signal lines is made of a same material and arranged at a same layer as one layer of leads, and the other layer of touch signal lines is made of a same material and arranged at a same layer as the other layer of leads.

20 Claims, 2 Drawing Sheets

DISPLAY SUBSTRATE, METHOD FOR MANUFACTURING THE SAME, AND DISPLAY DEVICE

CROSS-REFERENCE TO RELATED APPLICATION

This application claims priority to Chinese patent application No. 202011138437.3 filed on Oct. 22, 2020, which is incorporated herein by reference in its entirety.

TECHNICAL FIELD

The present disclosure relates to the field of display technology, in particular to a display substrate, a method for manufacturing the display substrate, and a display device.

BACKGROUND

For a full-screen display product (e.g., mobile phone), a screen is provided at its entire front surface, and a bezel-free design is adopted to acquire a screen-to-body ratio of approximately 100%. When the mobile phone is provided with a full screen, it is able to improve an appearance and a sense of science and technology of the entire mobile phone. In addition, the mobile phone is provided with a larger screen to significantly improve the visual experience.

SUMMARY

In one aspect, the present disclosure provides in some embodiments a display substrate, including a display region. The display region includes an under-screen camera region and a camera-free region. The display substrate includes: a base substrate; a driving circuitry layer arranged on the base substrate; a first driving signal line arranged at the camera-free region; a second driving signal line arranged at the under-screen camera region and at a side of the driving circuitry layer away from the base substrate, the first driving signal line being coupled to the driving circuitry layer via the second driving signal line to achieve a display function of the display substrate, a light transmittance of the first driving signal line being smaller than a light transmittance of the second driving signal line, and the second driving signal line including at least two layers of leads; and a touch structure arranged on the base substrate and arranged at at least one of the camera-free region and the under-screen camera region, the touch structure including at least two layers of touch signal lines, one layer of touch signal lines being made of a same material and arranged at a same layer as one layer of leads, and the other layer of touch signal lines being made of a same material and arranged at a same layer as the other layer of leads.

In a possible embodiment of the present disclosure, the touch structure includes a first touch pattern arranged at the camera-free region and including at least two layers of touch signal lines.

In a possible embodiment of the present disclosure, the at least two layers of touch signal lines in the first touch pattern include a first touch signal line and a second touch signal line arranged sequentially in a direction close to the base substrate, the first touch signal line includes a plurality of touch electrodes arranged in an array form, the touch electrodes arranged in a same row in a first direction are coupled to each other via connection bridges arranged at a same layer as the touch electrodes, the touch electrodes arranged in a same row in a second direction are coupled to each other via touch electrode bridges arranged at a layer different from the touch electrodes, the first touch signal line includes the touch electrodes and the connection bridges, and the second touch signal line includes the touch electrode bridges.

In a possible embodiment of the present disclosure, the at least two layers of leads include a first lead, a second lead and a third lead arranged sequentially in a direction away from the base substrate, the first touch signal line is made of a same material and arranged at a same layer as the third lead, and the second touch signal line is made of a same material and arranged at a same layer as the first lead or the second lead.

In a possible embodiment of the present disclosure, the at least two layers of leads include a first lead, a second lead and a third lead arranged sequentially in a direction away from the base substrate, the first touch signal line is made of a same material and arranged at a same layer as the second lead, and the second touch signal line is made of a same material and arranged at a same layer as the first lead.

In a possible embodiment of the present disclosure, each lead is an Indium Tin Oxide (ITO) lead.

In a possible embodiment of the present disclosure, a planarization layer is further arranged between two adjacent layers of leads.

In a possible embodiment of the present disclosure, the touch structure further includes a second touch pattern arranged at the under-screen camera region and including at least two layers of touch signal lines, one layer of touch signal lines is made of a same material, arranged at a same layer as one layer of leads and not electrically connected to the layer of leads, and the other layer of touch signal lines is made of a same material, arranged at a same layer as the other layer of leads and not electrically connected to the other layer of leads.

In a possible embodiment of the present disclosure, the at least two layers of touch signal lines in the second touch pattern include a third touch signal line and a fourth touch signal line arranged sequentially in a direction close to the base substrate, the third touch signal line includes a plurality of touch electrodes arranged in an array form, the touch electrodes arranged in a same row in the first direction are coupled to each other via connection bridges arranged at a same layer as the touch electrodes, the touch electrodes arranged in a same row in the second direction are coupled to each other via touch electrode bridges at a layer different from the touch electrodes, the third touch signal line includes the touch electrodes and the connection bridges, and the fourth touch signal line includes the touch electrode bridges.

In a possible embodiment of the present disclosure, the at least two layers of leads include a first lead, a second lead and a third lead arranged sequentially in a direction away from the base substrate, the third touch signal line is made of a same material and arranged at a same layer as the third lead, and the fourth touch signal line is made of a same material and arranged at a same layer as the first lead or the second lead.

In a possible embodiment of the present disclosure, the at least two layers of leads include a first lead, a second lead and a third lead arranged sequentially in a direction away from the base substrate, the third touch signal line is made of a same material and arranged at a same layer as the second lead, and the fourth touch signal line is made of a same material and arranged at a same layer as the first lead.

In another aspect, the present disclosure provides in some embodiments a display device including the above-mentioned display substrate.

In yet another aspect, the present disclosure provides in some embodiments a method for manufacturing a display substrate. The display substrate includes a display region, the display region includes an under-screen camera region and a camera-free region, and the display substrate further includes a first driving signal line arranged at the camera-free region. The method includes: providing a base substrate; forming a driving circuitry layer on the base substrate; and forming a second driving signal line and a touch structure at a side of the driving circuitry layer away from the base substrate. The first driving signal line is coupled to the driving circuitry layer via the second driving signal line to achieve a display function of the display substrate, a light transmittance of the first driving signal line is smaller than a light transmittance of the second driving signal line, the second driving signal line includes at least two layers of leads, the touch structure is arranged at at least one of the camera-free region and the under-screen camera region and includes at least two layers of touch signal lines, one layer of touch signal lines is made of a same material and arranged at a same layer as one layer of leads, and the other layer of touch signal lines is made of a same material and arranged at a same layer as the other layer of leads.

In a possible embodiment of the present disclosure, the forming the second driving signal line and the touch structure at the side of the driving circuitry layer away from the base substrate includes: forming the one layer of touch signal lines and the one layer of leads with a same mask through a single patterning process; and forming the other layer of touch signal lines and the other layer of leads with a same mask through a single patterning process.

In a possible embodiment of the present disclosure, the touch structure includes a first touch pattern arranged at the camera-free region and including a first touch signal line and a second touch signal line arranged sequentially in a direction close to the base substrate, and the at least two layers of leads include a first lead, a second lead and a third lead arranged sequentially in a direction away from the base substrate. Subsequent to forming the driving circuitry layer on the base substrate, the method further includes forming a first planarization layer at the side of the driving circuitry layer away from the base substrate. The forming the second driving signal line and the touch structure at the side of the driving circuitry layer away from the base substrate includes: forming the first lead on the first planarization layer with a first mask; forming a second planarization layer on the first lead; forming the second lead and the second touch signal line of the first touch pattern on the second planarization layer with a second mask; forming a third planarization layer; and forming the third lead and the first touch signal line of the first touch pattern on the third planarization layer with a third mask.

In a possible embodiment of the present disclosure, the touch structure includes a first touch pattern arranged at the camera-free region and including a first touch signal line and a second touch signal line arranged sequentially in a direction close to the base substrate, and the at least two layers of leads include a first lead, a second lead and a third lead arranged sequentially in a direction away from the base substrate. Subsequent to forming the driving circuitry layer on the base substrate, the method further includes forming a first planarization layer at the side of the driving circuitry layer away from the base substrate. The forming the second driving signal line and the touch structure at the side of the driving circuitry layer away from the base substrate includes: forming the first lead and the second touch signal line of the first touch pattern on the first planarization layer with a first mask; forming a second planarization layer on the first lead; forming the second lead on the second planarization layer with a second mask; forming a third planarization layer; and forming the third lead and the first touch signal line of the first touch pattern on the third planarization layer with a third mask.

In a possible embodiment of the present disclosure, the touch structure includes a first touch pattern arranged at the camera-free region and including a first touch signal line and a second touch signal line arranged sequentially in a direction close to the base substrate, and the at least two layers of leads include a first lead, a second lead and a third lead arranged sequentially in a direction away from the base substrate. Subsequent to forming the driving circuitry layer on the base substrate, the method further includes forming a first planarization layer at the side of the driving circuitry layer away from the base substrate. The forming the second driving signal line and the touch structure at the side of the driving circuitry layer away from the base substrate includes: forming the first lead and the second touch signal line of the first touch pattern on the first planarization layer with a first mask; forming a second planarization layer on the first lead; forming the second lead and the first touch signal line on the second planarization layer with a second mask; forming a third planarization layer; and forming the third lead on the third planarization layer with a third mask.

In a possible embodiment of the present disclosure, the touch structure includes a first touch pattern arranged at the camera-free region and a second touch pattern arranged at the under-scree camera region, the first touch pattern includes a first touch signal line and a second touch signal line arranged sequentially in a direction close to the base substrate, the second touch pattern includes a third touch signal line and a fourth touch signal line arranged sequentially in the direction close to the base substrate, and the at least two layers of leads include a first lead, a second lead and a third lead arranged sequentially in a direction away from the base substrate. Subsequent to forming the driving circuitry layer on the base substrate, the method further includes forming a first planarization layer at the side of the driving circuitry layer away from the base substrate. The forming the second driving signal line and the touch structure at the side of the driving circuitry layer away from the base substrate includes: forming the first lead on the first planarization layer with a first mask; forming a second planarization layer on the first lead; forming the second lead, the second touch signal line of the first touch pattern and the fourth touch signal line of the second touch pattern on the second planarization layer with a second mask; forming a third planarization layer; forming the third lead, the first touch signal line of the first touch pattern and the third touch signal line of the second touch pattern on the third planarization layer with a third mask.

In a possible embodiment of the present disclosure, the touch structure includes a first touch pattern arranged at the camera-free region and a second touch pattern arranged at the under-scree camera region, the first touch pattern includes a first touch signal line and a second touch signal line arranged sequentially in a direction close to the base substrate, the second touch pattern includes a third touch signal line and a fourth touch signal line arranged sequentially in the direction close to the base substrate, and the at least two layers of leads include a first lead, a second lead and a third lead arranged sequentially in a direction away from the base substrate. Subsequent to forming the driving circuitry layer on the base substrate, the method further includes forming a first planarization layer at the side of the driving circuitry layer away from the base substrate. The forming the second driving signal line and the touch structure at the side of the driving circuitry layer away from the base substrate includes: forming the first lead, the second touch signal line of the first touch pattern and the fourth touch signal line of the second touch pattern on the first planarization layer with a first mask; forming a second planarization layer on the first lead; forming the second lead on the second planarization layer with a second mask; forming a third planarization layer; and forming the third lead, the first touch signal line of the first touch pattern and the third touch signal line of the second touch pattern on the third planarization layer with a third mask.

In a possible embodiment of the present disclosure, the touch structure includes a first touch pattern arranged at the camera-free region and a second touch pattern arranged at the under-scree camera region, the first touch pattern includes a first touch signal line and a second touch signal line arranged sequentially in a direction close to the base substrate, the second touch pattern includes a third touch signal line and a fourth touch signal line arranged sequentially in the direction close to the base substrate, and the at least two layers of leads include a first lead, a second lead and a third lead arranged sequentially in a direction away from the base substrate. Subsequent to forming the driving circuitry layer on the base substrate, the method further includes forming a first planarization layer at the side of the driving circuitry layer away from the base substrate. The forming the second driving signal line and the touch structure at the side of the driving circuitry layer away from the base substrate includes: forming the first lead, the second touch signal line of the first touch pattern and the fourth touch signal line of the second touch pattern on the first planarization layer with a first mask; forming a second planarization layer on the first lead; forming the second lead, the first touch signal line of the first touch pattern and the third touch signal line of the second touch pattern on the second planarization layer with a second mask; forming a third planarization layer; and forming the third lead on the third planarization layer with a third mask.

DETAILED DESCRIPTION

Figure 1:
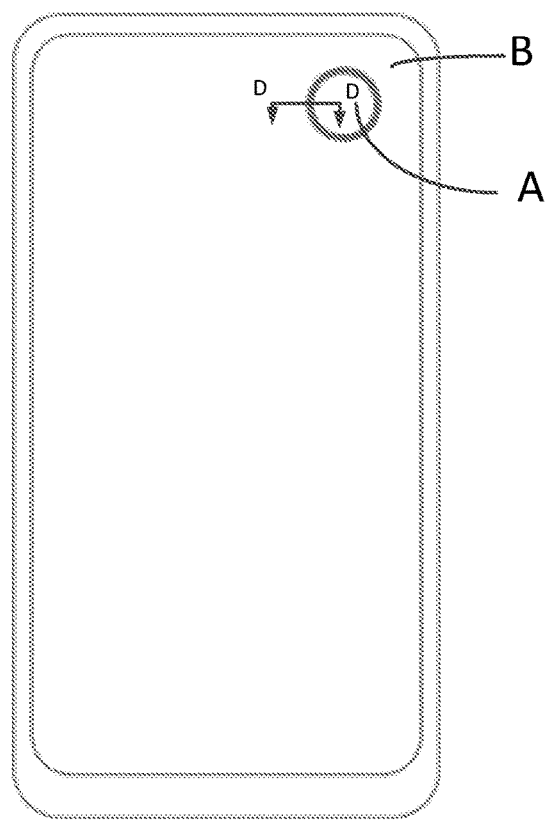
FIG. 1 is a structural schematic view showing a display substrate according to one embodiment of the present disclosure.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

In the embodiments of the present disclosure, it should be appreciated that, such words as "in the middle of", "on/above", "under/below", "left", "right", "vertical", "horizontal", "inside" and "outside" may be used to indicate directions or positions as viewed in the drawings, and they are merely used to facilitate the description in the present disclosure, rather than to indicate or imply that a device or member must be arranged or operated at a specific position. In addition, such words as "first", "second" and "third" may be merely used to differentiate different components rather than to indicate or imply any importance.

Before the detailed description on the embodiments of the present disclosure, it is necessary to describe the related art as follows.

In the related art, an under-screen camera is adopted to achieve a full-screen design. In order to increase a light transmittance at an under-screen camera region and reduce the quantity of BP (display driving circuitry) lines at the under-screen camera region, currently a driving circuitry extraction scheme at the under-screen camera region has been proposed, i.e., an original BP line is adopted at a camera-free region, and a driving signal line made of a transparent ITO material is adopted at the under-screen camera region to transmit a driving signal at the under-screen camera region. Due to the limit of a line width, usually three layers of ITO lines are required. Hence, on the basis of an original BP process, masks for the three layers of ITO lines and three layers of planarization layers (PLN) need to be provided, leading to an increase in the manufacture cost and the process complexity.

An object of the present disclosure is to provide a display substrate, a method for manufacturing the display substrate and a display device, so as to achieve a touch-in-cell function without any additional masks, and replace a Flexible Multi-Layer On Cell (FMLOC) or an add-on Touch Sensor Panel (TSP), thereby to reduce the manufacture cost and simplify the manufacture process.

Figure 2:
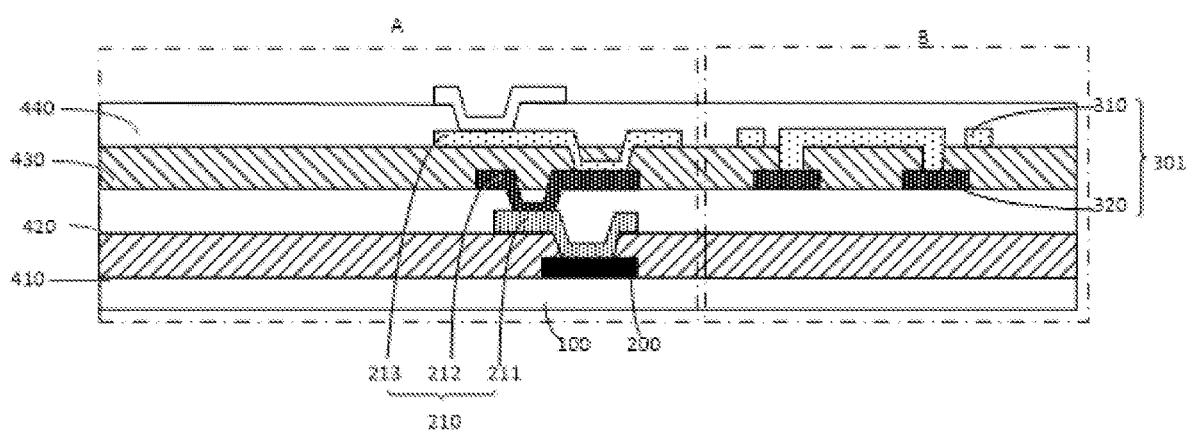
FIG. 2 is a sectional view of the display substrate along a line D-D in FIG. 1 according to one embodiment of the present disclosure.
Figure 3:
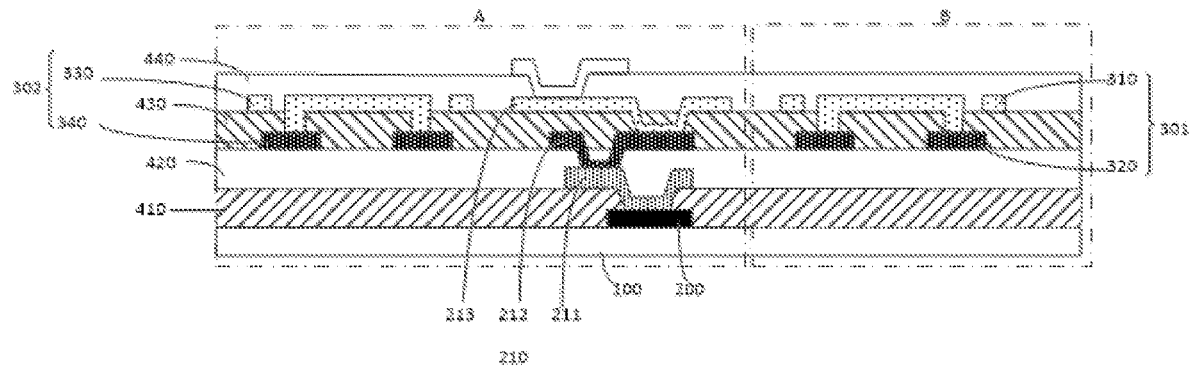
FIG. 3 is another sectional view of the display substrate along the line D-D in FIG. 1 according to one embodiment of the present disclosure.
Figure 4:
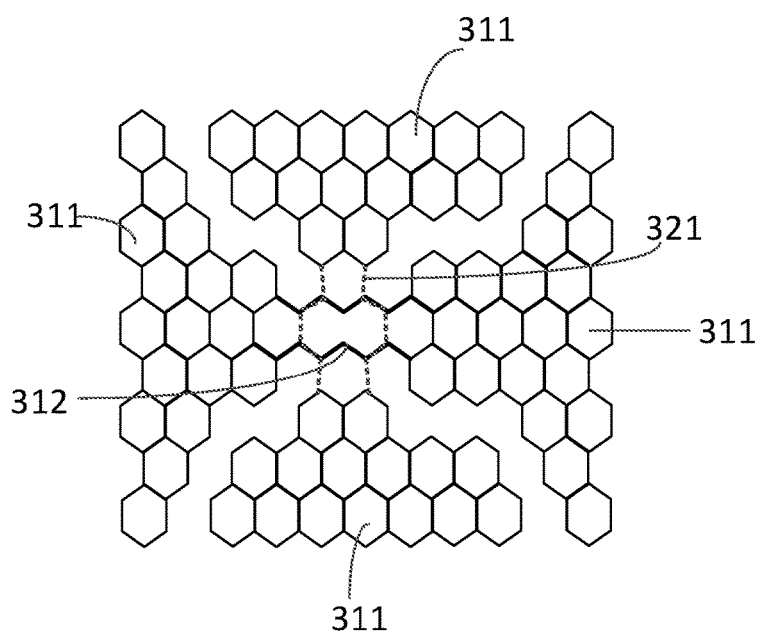
FIG. 4 is a structural schematic view showing a first touch signal line and a second touch signal line of a touch structure in the display substrate according to one embodiment of the present disclosure.

As shown in FIGS. 1 to 3, the present disclosure provides in some embodiments a display substrate, which includes a display region. The display region includes an under-screen camera region A and a camera-free region B. The display substrate includes: a base substrate 100; a driving circuitry layer 200 arranged on the base substrate 100; a first driving signal line (not shown) arranged at the camera-free region; a second driving signal line 210 arranged at the under-screen camera region and at a side of the driving circuitry layer away from the base substrate, the first driving signal line being coupled to the driving circuitry layer via the second driving signal line 210 to achieve a display function of the display substrate, a light transmittance of the first driving signal line being smaller than a light transmittance of the second driving signal line 210, and the second driving signal line 210 including at least two layers of leads; and a touch structure arranged on the base substrate 100 and arranged at at least one of the camera-free region B and the under-screen camera region A, the touch structure including at least two layers of touch signal lines, one layer of touch signal lines being made of a same material and arranged at a same layer as one layer of leads, and the other layer of touch signal lines being made of a same material and arranged at a same layer as the other layer of leads.

According to the display substrate in the embodiments of the present disclosure, the first driving signal line may be arranged at the camera-free region B, the second driving signal line 210 may be arranged at the under-screen camera region A, and the light transmittance of the second driving signal line 210 may be greater than that of the first driving signal line. In other words, a driving signal line extraction scheme at the under-screen camera region A may be adopted, and the driving signal line at the under-screen camera region A may be made of a material having a higher light transmittance so as to improve the light transmittance at the under-screen camera region A. Based on the extraction of the driving signal line (i.e., the second driving signal line 210) at the under-screen camera region A, the second driving signal line 210 may be made of a same material and arranged at a same layer as the touch signal line of the in-cell touch structure, so as to form the touch signal line of the touch structure while forming the two layers of leads through modifying masks for the leads of the second driving signal line 210 at the under-screen camera region A. As a result, it is able to achieve a touch-in-cell function while ensuring the light transmittance at the under-screen camera region A without any additional masks, and replace the FMLOC or add-on TSP, thereby to reduce the manufacture cost and simplify the manufacture process.

In some embodiments of the present disclosure, as shown in FIG. 2, the touch structure includes a first touch pattern 301 arranged at the camera-free region and including at least two layers of touch signal lines.

For example, the at least two layers of touch signal lines in the first touch pattern 301 may include a first touch signal line 310 and a second touch signal line 320 arranged sequentially in a direction close to the base substrate 100, the first touch signal line 310 may include a plurality of touch electrodes 311 arranged in an array form, the touch electrodes 311 arranged in a same row in a first direction may be coupled to each other via connection bridges 312 arranged at a same layer as the touch electrodes 311, the touch electrodes 311 arranged in a same row in a second direction may be coupled to each other via touch electrode bridges 321 arranged at a layer different from the touch electrodes 311, the first touch signal line 310 may include the touch electrodes 311 and the connection bridges 312, and the second touch signal line 320 may include the touch electrode bridges 321.

For example, the at least two layers of leads may include a first lead 211, a second lead 212 and a third lead 213 arranged sequentially in a direction away from the base substrate 100, the first touch signal line 310 may be made of a same material and arranged at a same layer as the third lead 213, and the second touch signal line 320 may be made of a same material and arranged at a same layer as the second lead 212.

In the embodiments of the present disclosure, at least three layers of leads may be arranged at the under-screen camera region A, and at least two layers of touch signal lines may be arranged at the camera-free region B. The first touch signal line 310 may include the touch electrodes and the connection bridges 312, and it may be a metal layer of the touch structure. The second touch signal line 320 may include the touch electrode bridges 321, and it may be a bridge layer of the touch structure. The first touch signal line 310 may be arranged at a side of the second touch signal line 320 away from the base substrate 100, i.e., the first touch signal line 310 may be located above the second touch signal line 320, so as to improve the touch sensitivity.

Further, the first lead 211, the second lead 212 and the third lead 213 may be arranged from bottom to top at the under-screen camera region A. The third lead 213 may be arranged at a side furthest away from the base substrate 100, and made of a same material and arranged at a same layer as the first touch signal line 310, and the second touch signal line 320 may be made of a same material and arranged at a same layer as the second lead 212, so as to simplify the manufacture process.

In some other embodiments of the present disclosure, the first touch signal line 310 may be made of a same material and arranged at a same layer as the third lead 213, and the second touch signal line 320 may be made of a same material and arranged at a same layer as the first lead 211.

In some other embodiments of the present disclosure, the first touch signal line 310 may be made of a same material and arranged at a same layer as the second lead 212, and the second touch signal line 320 may be made of a same material and arranged at a same layer as the first lead 211.

In addition, it should be appreciated that, in the embodiments of the present disclosure, the lead shall be made of a material having a high light transmittance, e.g., ITO. In other words, each lead may be an ITO lead. Of course, it should be further appreciated that, in practical applications, the lead may also be made of any other materials, which will not be particularly defined herein.

In addition, in some embodiments of the present disclosure, as shown in FIG. 2, a planarization layer may be arranged between two adjacent layers of leads. For example, in FIG. 2, a first planarization layer (PLN1) 410 is arranged between the first lead 211 and the driving circuitry layer 200, a second planarization layer (PLN2) 420 is arranged between the first lead 211 and the second lead 212, a third planarization layer (PLN3) 430 is arranged between the second lead 212 and the third lead 213, and a fourth planarization layer (PLN4) 440 is arranged at a side of the third lead 213 away from the base substrate 100.

In addition, in the related art, an FMLOC touch scheme is preferred by users, and in order to ensure the light transmittance at the under-screen camera region A, there is no touch signal line for achieving the touch function at the under-screen camera region A when the FMLOC scheme is used. At this time, it is impossible to provide the touch function at the under-screen camera region A, and thereby inconvenience is caused for the users.

In order to solve the above-mentioned problem, in some embodiments of the present disclosure, as shown in FIG. 3, the touch structure further includes a second touch pattern 302 arranged at the under-screen camera region A and including at least two layers of touch signal lines. One layer of touch signal lines is made of a same material, arranged at a same layer as one layer of leads and not electrically connected to the layer of leads, and the other layer of touch signal lines is made of a same material, arranged at a same layer as the other layer of leads and not electrically connected to the other layer of leads.

Based on the above, the touch signal line which is subsequently used as the touch structure may be patterned while forming the two layers of leads as second signal leads through modifying masks for the leads at the under-screen camera region A, so it is able to achieve the touch-in-cell function at the under-screen camera region A without any additional masks, and solve the problem that it is impossible to achieve the touch function in the FMLOC scheme while ensuring the light transmittance at the under-screen camera region A, thereby to provide an effective scheme for realizing a full screen.

In some embodiments of the present disclosure, as shown in FIG. 3, the at least two layers of touch signal lines in the second touch pattern 302 include a third touch signal line 330 and a fourth touch signal line 340 arranged sequentially in the direction close to the base substrate 100, the third touch signal line 330 includes a plurality of touch electrodes arranged in an array form, the touch electrodes arranged in a same row in the first direction are coupled to each other via connection bridges arranged at a same layer as the touch electrodes, the touch electrodes arranged in a same row in the second direction are coupled to each other via touch electrode bridges at a layer different from the touch electrodes, the third touch signal line 330 includes the touch electrodes and the connection bridges, and the fourth touch signal line 340 includes the touch electrode bridges.

In some embodiments of the present disclosure, the at least two layers of leads may include a first lead 211, a second lead 212 and a third lead 213 arranged sequentially in the direction away from the base substrate 100, the third touch signal line 330 may be made of a same material and arranged at a same layer as the third lead 213, and the fourth touch signal line 340 may be made of a same material and arranged at a same layer as the first lead or the second lead 212.

In the embodiments of the present disclosure, at least three layers of leads may be arranged at the under-screen camera region A, and at least two layers of touch signal lines may be arranged at the under-screen camera region A. The third touch signal line 330 may include the touch electrodes and the connection bridges, and it may be a metal layer of the touch structure and have a structure approximately identical to or different from the first touch signal line 310. The fourth touch signal line 340 may include the touch electrode bridges, and it may be a bridge layer of the touch structure and have a structure approximately identical to or different from the second touch signal line 320. The third touch signal line 330 may be arranged at a side of the fourth touch signal line 340 away from the base substrate 100, i.e., the third touch signal line 330 may be located above the fourth touch signal line 340, so as to improve the touch sensitivity.

Further, the first lead 211, the second lead 212 and the third lead 213 may be arranged from bottom to top at the under-screen camera region A. The third lead 213 may be arranged at a side furthest away from the base substrate 100, and made of a same material and arranged at a same layer as the third touch signal line 330, and the fourth touch signal line 340 may be made of a same material and arranged at a same layer as the second lead 212, so as to simplify the manufacture process.

In some other embodiments of the present disclosure, the third touch signal line 330 may be made of a same material and arranged at a same layer as the third lead 213, and the fourth touch signal line 340 may be made of a same material and arranged at a same layer as the first lead 211.

In some other embodiments of the present disclosure, the third touch signal line 330 may be made of a same material and arranged at a same layer as the second lead 212, and the fourth touch signal line 340 may be made of a same material and arranged at a same layer as the first lead 211.

The present disclosure further provides in some embodiments a display device including the above-mentioned display substrate. The display device may be any product or member having a display function, e.g., a liquid crystal television, a liquid crystal display, a digital photo frame, a mobile phone or a tablet computer. The display device may further include a flexible circuit board, a printed circuit board and a back plate.

The present disclosure further provides in some embodiments a method for manufacturing the display substrate. The display substrate includes a display region, the display region includes an under-screen camera region and a camera-free region, and the display substrate further includes a first driving signal line arranged at the camera-free region. The method includes: Step S01 of providing a base substrate 100; Step S02 of forming a driving circuitry layer 200 on the base substrate 100; and Step S03 of forming a second driving signal line 210 and a touch structure at a side of the driving circuitry layer away from the base substrate. The first driving signal line is coupled to the driving circuitry layer via the second driving signal line to achieve a display function of the display substrate, a light transmittance of the first driving signal line is smaller than a light transmittance of the second driving signal line 210, the second driving signal line 210 includes at least two layers of leads, the touch structure is arranged at at least one of the camera-free region B and the under-screen camera region A and includes at least two layers of touch signal lines, one layer of touch signal lines is made of a same material and arranged at a same layer as one layer of leads, and the other layer of touch signal lines is made of a same material and arranged at a same layer as the other layer of leads.

In some embodiments of the present disclosure, Step S03 may specifically include: forming the one layer of touch signal lines and the one layer of leads with a same mask through a single patterning process; and forming the other layer of touch signal lines and the other layer of leads with a same mask through a single patterning process.

The method for manufacturing the display substrate in the drawings may include the following steps.

Step S01: providing the base substrate 100.

Step S02: forming the driving circuitry layer 200 on the base substrate 100.

In Step S02, the driving circuitry layer 200 may be formed through a conventional BP process, and it may include a thin film transistor, a gate line and a data line. A first planarization layer may be formed at a side of the driving circuitry layer 200 away from the base substrate 100.

Step S03: forming the second driving signal line 210 and the touch structure at the side of the driving circuitry layer 200 away from the base substrate 100. To be specific, Step S03 may include: Step S031 of forming the first lead 211 on the first planarization layer with a first mask; Step S032 of forming a second planarization layer 420 on the first lead 211; Step S033 of forming the second lead 212 and the second touch signal line 320 of the first touch pattern 301 (when the second touch pattern 302 is also arranged at the under-screen camera region A, the fourth touch signal line 340 of the second touch pattern 302 may be further formed while forming the second lead 212 and the second touch signal line 320) on the second planarization layer 420 with a second mask; Step S034 of forming a third planarization layer 430; Step S035 of forming the third lead 213 and the first touch signal line 310 of the first touch pattern 301 (when the second touch pattern 302 is also arranged at the under-screen camera region A, the third touch signal line 330 of the second touch pattern 302 may be further formed while forming the third lead 213 and the second touch signal line 310) on the third planarization layer 430 with a third mask; and Step S036 of forming a fourth planarization layer 440.

Some descriptions will be given as follows.

(1) The drawings merely relate to structures involved in the embodiments of the present disclosure, and the other structures may refer to those known in the art.

(2) For clarification, in the drawings for describing the embodiments of the present disclosure, a thickness of a layer or region is zoomed out or in, i.e., these drawings are not provided in accordance with an actual scale. It should be appreciated that, in the case that such an element as layer, film, region or substrate is arranged "on" or "under" another element, it may be directly arranged "on" or "under" the other element, or an intermediate element may be arranged therebetween.

(3) In the case of no conflict, the embodiments of the present disclosure and the features therein may be combined to acquire new embodiments.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A display substrate, comprising a display region, wherein the display region comprises an under-screen camera region and a camera-free region,
wherein the display substrate comprises:
a base substrate;
a driving circuitry layer arranged on the base substrate;
a first driving signal line arranged at the camera-free region;
a second driving signal line arranged at the under-screen camera region and at a side of the driving circuitry layer away from the base substrate, the first driving signal line being coupled to the driving circuitry layer via the second driving signal line to achieve a display function of the display substrate, a light transmittance of the first driving signal line being smaller than a light transmittance of the second driving signal line, and the second driving signal line comprising at least two layers of leads; and
a touch structure arranged on the base substrate and arranged at at least one of the camera-free region and the under-screen camera region, the touch structure comprising at least two layers of touch signal lines, one layer of touch signal lines being made of a same material and arranged at a same layer as one layer of leads, and the other layer of touch signal lines being made of a same material and arranged at a same layer as the other layer of leads.

2. The display substrate according to claim 1, wherein the touch structure comprises a first touch pattern arranged at the camera-free region and comprising at least two layers of touch signal lines.

3. The display substrate according to claim 2, wherein the at least two layers of touch signal lines in the first touch pattern comprise a first touch signal line and a second touch signal line arranged sequentially in a direction close to the base substrate, the first touch signal line comprises a plurality of touch electrodes arranged in an array form, the touch electrodes arranged in a same row in a first direction are coupled to each other via connection bridges arranged at a same layer as the touch electrodes, the touch electrodes arranged in a same row in a second direction are coupled to each other via touch electrode bridges arranged at a layer different from the touch electrodes, the first touch signal line comprises the touch electrodes and the connection bridges, and the second touch signal line comprises the touch electrode bridges.

4. The display substrate according to claim 3, wherein the at least two layers of leads comprise a first lead, a second lead and a third lead arranged sequentially in a direction away from the base substrate, the first touch signal line is made of a same material and arranged at a same layer as the third lead, and the second touch signal line is made of a same material and arranged at a same layer as the first lead or the second lead.

5. The display substrate according to claim 3, wherein the at least two layers of leads comprise a first lead, a second lead and a third lead arranged sequentially in a direction away from the base substrate, the first touch signal line is made of a same material and arranged at a same layer as the second lead, and the second touch signal line is made of a same material and arranged at a same layer as the first lead.

6. The display substrate according to claim 2, wherein the touch structure further comprises a second touch pattern arranged at the under-screen camera region and comprising at least two layers of touch signal lines, one layer of touch signal lines is made of a same material, arranged at a same layer as one layer of leads and not electrically connected to the layer of leads, and the other layer of touch signal lines is made of a same material, arranged at a same layer as the other layer of leads and not electrically connected to the other layer of leads.

7. The display substrate according to claim 6, wherein the at least two layers of touch signal lines in the second touch pattern comprise a third touch signal line and a fourth touch signal line arranged sequentially in a direction close to the base substrate, the third touch signal line comprises a plurality of touch electrodes arranged in an array form, the touch electrodes arranged in a same row in the first direction are coupled to each other via connection bridges arranged at a same layer as the touch electrodes, the touch electrodes arranged in a same row in the second direction are coupled to each other via touch electrode bridges at a layer different from the touch electrodes, the third touch signal line comprises the touch electrodes and the connection bridges, and the fourth touch signal line comprises the touch electrode bridges.

8. The display substrate according to claim 7, wherein the at least two layers of leads comprise a first lead, a second lead and a third lead arranged sequentially in a direction away from the base substrate, the third touch signal line is made of a same material and arranged at a same layer as the third lead, and the fourth touch signal line is made of a same material and arranged at a same layer as the first lead or the second lead.

9. The display substrate according to claim 7, wherein the at least two layers of leads comprise a first lead, a second lead and a third lead arranged sequentially in a direction away from the base substrate, the third touch signal line is made of a same material and arranged at a same layer as the second lead, and the fourth touch signal line is made of a same material and arranged at a same layer as the first lead.

10. The display substrate according to claim 1, wherein each lead is an Indium Tin Oxide (ITO) lead.

11. The display substrate according to claim 1, wherein a planarization layer is further arranged between two adjacent layers of leads.

12. A display device, comprising the display substrate according to claim 1.

13. A method for manufacturing a display substrate, wherein the display substrate comprises a display region, the display region comprises an under-screen camera region and a camera-free region, and the display substrate further comprises a first driving signal line arranged at the camera-free region,
wherein the method comprises:
providing a base substrate;
forming a driving circuitry layer on the base substrate; and forming a second driving signal line and a touch structure at a side of the driving circuitry layer away from the base substrate, wherein the first driving signal line is coupled to the driving circuitry layer via the second driving signal line to achieve a display function of the display substrate, a light transmittance of the first driving signal line is smaller than a light transmittance of the second driving signal line, the second driving signal line comprises at least two layers of leads, the touch structure is arranged at at least one of the camera-free region and the under-screen camera region and comprises at least two layers of touch signal lines, one layer of touch signal lines is made of a same material and arranged at a same layer as one layer of leads, and the other layer of touch signal lines is made of a same material and arranged at a same layer as the other layer of leads.

14. The method according to claim 13, wherein the forming the second driving signal line and the touch structure at the side of the driving circuitry layer away from the base substrate comprises: forming the one layer of touch signal lines and the one layer of leads with a same mask through a single patterning process; and forming the other layer of touch signal lines and the other layer of leads with a same mask through a single patterning process.

15. The method according to claim 13, wherein the touch structure comprises a first touch pattern arranged at the camera-free region and comprising a first touch signal line and a second touch signal line arranged sequentially in a direction close to the base substrate, and the at least two layers of leads comprise a first lead, a second lead and a third lead arranged sequentially in a direction away from the base substrate;

subsequent to forming the driving circuitry layer on the base substrate, the method further comprises forming a first planarization layer at the side of the driving circuitry layer away from the base substrate; and the forming the second driving signal line and the touch structure at the side of the driving circuitry layer away from the base substrate comprises: forming the first lead on the first planarization layer with a first mask; forming a second planarization layer on the first lead; forming the second lead and the second touch signal line of the first touch pattern on the second planarization layer with a second mask; forming a third planarization layer; and forming the third lead and the first touch signal line of the first touch pattern on the third planarization layer with a third mask.

16. The method according to claim 13, wherein the touch structure comprises a first touch pattern arranged at the camera-free region and comprising a first touch signal line and a second touch signal line arranged sequentially in a direction close to the base substrate, and the at least two layers of leads comprise a first lead, a second lead and a third lead arranged sequentially in a direction away from the base substrate;

subsequent to forming the driving circuitry layer on the base substrate, the method further comprises forming a first planarization layer at the side of the driving circuitry layer away from the base substrate; and the forming the second driving signal line and the touch structure at the side of the driving circuitry layer away from the base substrate comprises: forming the first lead and the second touch signal line of the first touch pattern on the first planarization layer with a first mask; forming a second planarization layer on the first lead; forming the second lead on the second planarization layer with a second mask; forming a third planarization layer; and forming the third lead and the first touch signal line of the first touch pattern on the third planarization layer with a third mask.

17. The method according to claim 13, wherein the touch structure comprises a first touch pattern arranged at the camera-free region and comprising a first touch signal line and a second touch signal line arranged sequentially in a direction close to the base substrate, and the at least two layers of leads comprise a first lead, a second lead and a third lead arranged sequentially in a direction away from the base substrate;

subsequent to forming the driving circuitry layer on the base substrate, the method further comprises forming a first planarization layer at the side of the driving circuitry layer away from the base substrate; and the forming the second driving signal line and the touch structure at the side of the driving circuitry layer away from the base substrate comprises: forming the first lead and the second touch signal line of the first touch pattern on the first planarization layer with a first mask; forming a second planarization layer on the first lead; forming the second lead and the first touch signal line on the second planarization layer with a second mask; forming a third planarization layer; and forming the third lead on the third planarization layer with a third mask.

18. The method according to claim 13, wherein the touch structure comprises a first touch pattern arranged at the camera-free region and a second touch pattern arranged at the under-scree camera region, the first touch pattern comprises a first touch signal line and a second touch signal line arranged sequentially in a direction close to the base substrate, the second touch pattern comprises a third touch signal line and a fourth touch signal line arranged sequentially in the direction close to the base substrate, and the at least two layers of leads comprise a first lead, a second lead and a third lead arranged sequentially in a direction away from the base substrate;

subsequent to forming the driving circuitry layer on the base substrate, the method further comprises forming a first planarization layer at the side of the driving circuitry layer away from the base substrate; and the forming the second driving signal line and the touch structure at the side of the driving circuitry layer away from the base substrate comprises: forming the first lead on the first planarization layer with a first mask; forming a second planarization layer on the first lead; forming the second lead, the second touch signal line of the first touch pattern and the fourth touch signal line of the second touch pattern on the second planarization layer with a second mask; forming a third planarization layer; forming the third lead, the first touch signal line of the first touch pattern and the third touch signal line of the second touch pattern on the third planarization layer with a third mask.

19. The method according to claim 13, wherein the touch structure comprises a first touch pattern arranged at the camera-free region and a second touch pattern arranged at the under-scree camera region, the first touch pattern comprises a first touch signal line and a second touch signal line arranged sequentially in a direction close to the base substrate, the second touch pattern comprises a third touch signal line and a fourth touch signal line arranged sequentially in the direction close to the base substrate, and the at least two layers of leads comprise a first lead, a second lead and a third lead arranged sequentially in a direction away from the base substrate;

subsequent to forming the driving circuitry layer on the base substrate, the method further comprises forming a first planarization layer at the side of the driving circuitry layer away from the base substrate; and the forming the second driving signal line and the touch structure at the side of the driving circuitry layer away from the base substrate comprises: forming the first lead, the second touch signal line of the first touch pattern and the fourth touch signal line of the second touch pattern on the first planarization layer with a first mask; forming a second planarization layer on the first lead; forming the second lead on the second planarization layer with a second mask; forming a third planarization layer; and forming the third lead, the first touch signal line of the first touch pattern and the third touch signal line of the second touch pattern on the third planarization layer with a third mask.

20. The method according to claim 13, wherein the touch structure comprises a first touch pattern arranged at the camera-free region and a second touch pattern arranged at the under-scree camera region, the first touch pattern comprises a first touch signal line and a second touch signal line arranged sequentially in a direction close to the base substrate, the second touch pattern comprises a third touch signal line and a fourth touch signal line arranged sequentially in the direction close to the base substrate, and the at least two layers of leads comprise a first lead, a second lead and a third lead arranged sequentially in a direction away from the base substrate;

subsequent to forming the driving circuitry layer on the base substrate, the method further comprises forming a first planarization layer at the side of the driving circuitry layer away from the base substrate; and the forming the second driving signal line and the touch structure at the side of the driving circuitry layer away from the base substrate comprises: forming the first lead, the second touch signal line of the first touch pattern and the fourth touch signal line of the second touch pattern on the first planarization layer with a first mask; forming a second planarization layer on the first lead; forming the second lead, the first touch signal line of the first touch pattern and the third touch signal line of the second touch pattern on the second planarization layer with a second mask; forming a third planarization layer; and forming the third lead on the third planarization layer with a third mask.

* * * * *